May 1, 1962 K. J. PAYNE ET AL 3,032,696
DRIVING EQUIPMENT INCLUDING ELECTRIC MOTORS
Filed Feb. 13, 1959
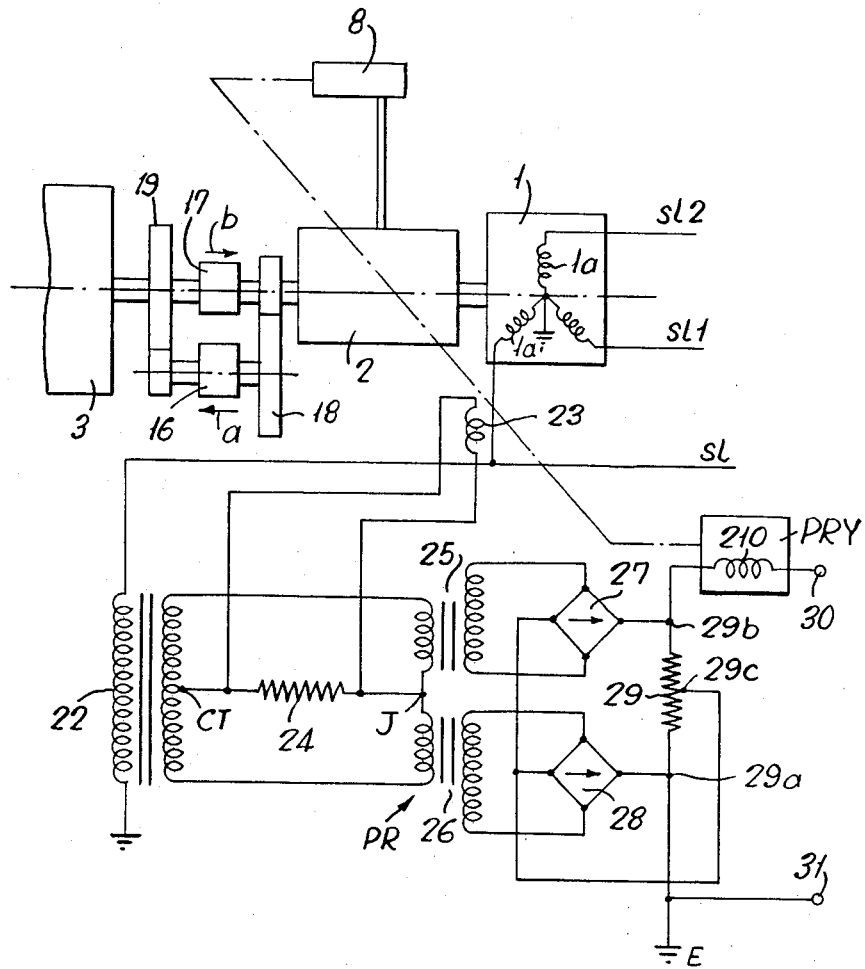
INVENTORS
KENNETH JACK PAYNE
LEONARD JACK CLARK
ATTORNEY United States Patent Office 3,032,696
Patented May 1, 1962

3,032,696
DRIVING EQUIPMENT INCLUDING
ELECTRIC MOTORS
Kenneth J. Payne, Coventry, and Leonard Jack Clark, Bilton, Rugby, England, assignors to The British Thomson-Houston Company Limited, London, England, a British company
Filed Feb. 13, 1959, Ser. No. 793,073
Claims priority, application Great Britain Feb. 19, 1958
2 Claims. (Cl. 318—11)

This invention relates to driving equipment of the kind including an electric motor, preferably an A.C. motor which may be of a synchronous or asynchronous type. Although not so limited the invention is particularly suitable to serve for starting an aircraft engine, such as a gas turbine, and for this application the invention advantageously includes also a means known per se through which the engine acting as a prime mover during its normal operation may supply driving power to the motor which now operates as generator.

Co-pending patent application No. 728,300 relates to a dynamo-electric machine-variable ratio speed changing gear combination, including a means for controlling automatically the ratio of said gear in dependence upon the magnitude of the current flowing through the dynamo-electric machine when operating as a motor, thereby to produce gear ratio changes neutralising load torque changes, and to maintain substantially constant the speed of the machine and the electric power drawn by the machine.

In one embodiment of the invention described in the specification of the abovementioned prior patent application the control means includes a dynamo-electric dynamometer having an electric circuit connected to a circuit of the driving motor, a biasing means being provided to define the angular displacement of the dynamometer rotor in accordance with the current flowing through the driving motor.

In many cases however it is desired to eliminate the moving parts and the inertia effect thereof in the control means in order to obtain a rapid response and long serviceable life independent of mechanical wear. This is achieved by the present invention wherein the control for the speed changing gear is made dependent upon the current flowing in a circuit arrangement which compares a reference voltage selected to indicate a predetermined power input to the motor with a voltage which is produced to form a measure of the actual power input to the said motor.

More details will be apparent from the following description referring to the single FIGURE of the accompanying drawing which shows a preferred embodiment of the present invention.

Referring to the drawing a dynamo-electric machine 1 suitable to operate as a motor for starting an engine 3 is coupled to the engine through a variable speed ratio, power transmitting device 2, of a kind known per se and therefore not described in detail here. The device 2 is preferably constructed to provide for a zero output speed setting and may be of a conventional hydraulic kind. Intermediary speed reducing and step-up gear trains 18, 19 respectively are arranged to become effective by the operation of free wheel devices 16, 17 which are known per se to transmit power in the direction $a$ when the dynamo-electric machine operates as a motor or in the direction $b$ when the dynamo-electric machine operates as a generator.

The means for controlling the speed ratio of the device 2 comprises a circuit arrangement as will be seen from the following:

A supply conductor $sl$ leading to one phase $1a'$ of a primary winding $1a$ of the driving motor 1 is coupled to a motor power responsive circuit PR by a voltage transformer 22 and a current transformer 23. The latter produces a voltage across a resistance 24, connected between a centre tap CT of the secondary winding of transformer 22 and a junction point J between primary windings of transformers 25 and 26. The secondary windings of these transformers are connected across bridge rectifiers 27 and 28. One of the two output corners of each bridge is connected to a centre tap 29c of a resistor 29, and the two opposite bridge corners are connected to the ends 29a, 29b of resistor 29, the end 29a being earthed at E. An energising coil 210 of a polarised relay PRY is connected between the other end 29b of resistor 29 and a terminal 30, a source (not shown) for supplying a reference voltage representing a desired power input being connected to the terminal 30 and a terminal 31 which is earthed.

This polarised relay PRY is employed in a known manner to operate a valve in the control device 8 of the variable speed ratio gear 2.

As can be seen the dynamo-electric machine 1 is mechanically coupled through the controlled speed changing device 2, which is preferably of a hydraulically kind and also constructed to provide for a zero output speed setting to the prime mover 3, using intermediary speed reducing and step-up gear trains 18, 19 arranged to become effective by the operation of free wheel devices 16, 17 known per se to transmit power in the direction $a$ to start the engine, or in the direction $b$ to drive the dynamo-electric machine when operating as generator.

The motor-power responsive and therefore indirectly speed responsive circuit PR operates as follows:

The voltage across each half of the secondary winding of transformer 22 is added to and subtracted from, respectively, the voltage produced across resistance 24 derived from the current transformer 23, so that the voltage across the primaries of transformers 25 and 26 are equal respectively to the vector sum and the vector difference of these voltages. It can be shown that the arithmetic difference of the magnitudes of the said sum and difference vectors is a function of the power taken by the motor. The secondary windings of transformers 25 and 26 supply through rectifiers 27 and 28 the resistor 29 in such a way that a current signal derived from transformer 25 flows between the top end 29b of the resistor and the tapping 29c, while a current signal derived from transformer 26 flows in the opposite direction between the bottom end 29a of the resistor 29 and the tapping 29c, so that the voltage developed across the whole resistor 29 is proportional to I1—I2 where I1 and I2 are the currents respectively proportional to the voltages applied to transformers 25 and 26.

The resultant voltage across the resistance 29 is therefore proportional to the actual power input to the motor 1. This voltage is compared with the reference voltage representing a predetermined power which should be provided to the motor and the resulting voltage causes current to flow which is used to operate the polarised relay PRY. Thus when the voltage across the resistance 29 is lower or higher than the reference voltage, that is when the motor is taking less or more than its specified power, the speed ratio of the gear 2 is automatically changed. Since with a given load on the motor the power taken by the motor is an inverse function of the gear ratio, the gear unit 2 will be controlled to increase or decrease as required the gear ratio so as to maintain at a predetermined level the power drawn by the motor.

It will be understood that variations are possible without departing from the invention. For instance, a magnetic amplifier can be used instead of the polarised relay, in which case the function of coil 210 would be replaced by that of the input circuit of the magnetic amplifier.

The range of the unit 2 need not be extended to provide for zero output speed, and in order to meet individual requirements a "constant speed" gear, that is a variable ratio gear which permits changing the speed at one end while the speed at the other end of the gear is substantially constant, of any suitable kind known in the art can be used in a combination according to the invention.

What we claim is:

1. An arrangement for producing a control motion in one and the other of two opposite directions responsive to changes in the opposite senses of current drawn by an electric motor, comprising an electromagnet having an armature arranged to cause the said motion, and having a coil the energization of which defines the armature motion and its sense, a resistor and a reference voltage source connected in series across said coil, two rectifiers, the output from one and the other of said rectifiers being connected between a centre point of said resistor and one and the other ends of said resistor, a first transformer having two secondary windings connected to the inputs of said two rectifiers, said transformer having two series connected primary windings electromagnetically coupled to said two secondary windings, said primary windings having a common joining point, a second transformer having a primary winding and a secondary winding, said primary winding being connected to a conductor which supplies said electric motor, said secondary winding having a centre point, a load resistor, said load resistor having one of its ends connected to said centre point of said secondary winding of said second transformer, and having the other of its ends connected to the said joining point of the two primary windings of said first transformer, a current transformer having a coil which is electromagnetically coupled to said conductor and is connected across said load resistor.

2. An arrangement as claimed in claim 1, including a hydraulic speed-change gear having a shaft coupled to the shaft of said motor, a hydraulic valve in said gear having two positions, and being effective in one position to cause gradual reduction of the ratio of said gear, and in the other position to cause a gradual increase of the ratio of said gear and said valve being linked to the said magnet armature to be brought to one and the other of said two positions as the armature moves in one and the other sense.

References Cited in the file of this patent

UNITED STATES PATENTS 2,350,913    Mercer                 June 6, 1944

FOREIGN PATENTS 518,366    Great Britain            Feb. 26, 1940